`US008317732B2`

(12) United States Patent
Yasuhara et al.

(10) Patent No.: US 8,317,732 B2
(45) Date of Patent: *Nov. 27, 2012

(54) MOTION ASSIST DEVICE

(75) Inventors: Ken Yasuhara, Wako (JP); Kei Shimada, Wako (JP); Yosuke Endo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 361 days.

This patent is subject to a terminal disclaimer.

(21) Appl. No.: 12/447,776

(22) PCT Filed: Aug. 19, 2008

(86) PCT No.: PCT/JP2008/002235
§ 371 (c)(1),
(2), (4) Date: Apr. 29, 2009

(87) PCT Pub. No.: WO2009/050838
PCT Pub. Date: Apr. 23, 2009

(65) Prior Publication Data
US 2010/0004577 A1 Jan. 7, 2010

(30) Foreign Application Priority Data
Oct. 15, 2007 (JP) ................................. 2007-268314

(51) Int. Cl.
*A61H 1/00* (2006.01)
*A61B 5/103* (2006.01)
*A61F 5/00* (2006.01)
(52) U.S. Cl. .............. 601/5; 601/35; 600/587; 600/595; 602/19; 602/23
(58) Field of Classification Search .......... 601/5, 33–35, 601/23; 602/16, 23–25; 703/11; 700/245–264; 600/587, 595
See application file for complete search history.

(56) References Cited

U.S. PATENT DOCUMENTS

| 6,872,187 | B1 * | 3/2005 | Stark et al. ...................... 602/16 |
| 2004/0158175 | A1 * | 8/2004 | Ikeuchi et al. .................... 601/5 |
| 2004/0249319 | A1 * | 12/2004 | Dariush ............................ 601/5 |
| 2005/0177080 | A1 * | 8/2005 | Yasuhara et al. ................ 602/16 |
| 2008/0249438 | A1 * | 10/2008 | Agrawal et al. ................. 601/35 |
| 2009/0062884 | A1 * | 3/2009 | Endo et al. ...................... 607/49 |
| 2009/0131839 | A1 * | 5/2009 | Yasuhara .......................... 601/5 |
| 2010/0234775 | A1 * | 9/2010 | Yasuhara et al. ................ 601/33 |
| 2010/0234777 | A1 * | 9/2010 | Yasuhara et al. ................ 601/35 |
| 2011/0288453 | A1 * | 11/2011 | Endo ............................... 601/35 |

FOREIGN PATENT DOCUMENTS

| JP | 2004-073649 | 3/2004 |
| JP | 2006-075456 | 3/2006 |
| JP | 2007-061217 | 3/2007 |

* cited by examiner

*Primary Examiner* — Justine Yu
*Assistant Examiner* — Kari Petrik
(74) *Attorney, Agent, or Firm* — Rankin, Hill & Clark LLP (57) ABSTRACT

Provided is a device capable of assisting a periodical motion of a creature, such as a human, by applying a force to the creature so as to match a motion rhythm and a motion scale of the periodical motion to a desired motion rhythm and a desired motion scale, respectively, while reducing computation processing load. According to a motion assist device (10) of the present invention, a value of a member or a coefficient contained in a simultaneous differential equation of a state variable ($u_i$) for defining a second model which generates a second oscillator ($\xi_2$) is adjusted by means of an adjusting device (14). The second oscillator ($\xi_2$) is generated by the adjusted second model and a torque (T) applied to a human (P) is controlled to vary periodically according to the second oscillator ($\xi_2$).

13 Claims, 6 Drawing Sheets

MOTION ASSIST DEVICE

BACKGROUND OF THE INVENTION

1. Field of the Invention

The present invention relates to a motion assist device for assisting a periodical motion of a creature by applying a force to the creature.

2. Description of the Related Art

There has been disclosed in Japanese Patent Laid-open No. 2004-073649 (hereinafter, referred to as Patent Document 1) a device for assisting a periodical walking motion of a creature, such as a human, whose body such as a lower limb or the like is suffering from hypofunction, by applying a periodically varying force to the human. There has also been disclosed in Japanese Patent Laid-open No. 2007-061217 (hereinafter, referred to as Patent Document 2) a device for assisting or guiding a periodical motion of a human by adjusting strength of a force applied to the human according to a second model (spring model) representing a behavior property of a virtual elastic element so as to match a motion scale of the human to a desired motion scale thereof.

However, when using a plurality of models to determine a variation pattern of an assisting force, it may be difficult to match a motion rhythm of the creature to a desired motion rhythm thereof due to a time lag to a completion of a computation processing. Although computation processing load may be reduced so as to resolve the problem of the time lag by curtailing a part of models from the plurality of models, it may result in an inappropriate variation pattern of the assisting force from the viewpoint of matching the motion rhythm of the creature to the desired motion rhythm thereof. Moreover, according to the spring model, the strength of force applied to the human varies according to a pace of the periodical motion rhythm of the human. Therefore, when a human moves at a fast velocity of some extent, the periodical motion of the human can be assisted accordingly by a force sufficiently strong from the viewpoint of matching the motion scale to the desired motion scale of the human. However, on the other hand, when the human moves at a slow velocity due to severe physical hypofunction, the force applied to the human by the motion guiding device may be insufficient from the viewpoint of matching the motion scale to the desired motion scale of the human.

SUMMARY OF THE INVENTION

The present invention has been accomplished in view of the aforementioned problems, and it is therefore an object of the present invention to provide a motion assist device capable of assisting a periodical motion of a creature, such as a human, by applying a force to the creature so as to match a motion rhythm and a motion scale to a desired motion rhythm and a desired motion scale of the periodical motion, respectively, while reducing computation processing load.

A first aspect of the present invention provides a motion assist device which comprises an orthosis mounted on a creature, an actuator connected to the orthosis and a controlling device configured to control an amplitude and a period or phase of an output of the actuator, and assists a periodical motion of the creature by applying the output to the creature through the orthosis, wherein the controlling device includes a motion oscillator determination element configured to determine a second motion oscillator which periodically varies according to a motion of the creature; a second oscillator generation element configured to generate a second oscillator, which serves as a control basis of the actuator, as an output oscillation signal from a second model by inputting the motion oscillator determined by the motion oscillator determination element as an input oscillation signal to the second model, which is defined by a simultaneous differential equation of a plurality of state variables representing a behavior state of the creature for generating the output oscillation signal varying at an angular velocity defined according to an intrinsic angular velocity on the basis of the input oscillation signal; and an adjusting device configured to adjust a value of a member or a coefficient contained in the simultaneous differential equation.

According to the motion assist device of the first aspect of the present invention, since only the second model is used, resultantly, it is possible to reduce the computation processing load for generating the second oscillator. Furthermore, a value of a member or a coefficient contained in the simultaneous differential equation of the state variables for defining the second model which is used to generate the second oscillator is adjusted by the adjusting device. The second oscillator is generated according to the adjusted second model, and the force applied to the creature is controlled to vary periodically according to the second oscillator. Therefore, the periodical motion of the creature can be assisted by applying the force to the creature so as to match the motion rhythm and the motion scale to a desired motion rhythm and a desired motion scale of the periodical motion, respectively, while reducing the computation processing load. Note that the nomenclature of the terms of "a second motion oscillator" and "a second model" is only for the purpose of keeping these terms consistent with those used in the related inventions disclosed in the Patent Document 1, Patent Document 2 and so forth by the applicant, and therefore, they should not be understood as an indication that there are a first motion oscillator and a first model existed.

A second aspect of the motion assist device of the present invention is dependent on the first aspect of the present invention, wherein the simultaneous differential equation for defining the second model contains a time constant representing a variation pattern of the plurality of state variables, and a value of the time constant is adjusted by the adjusting device.

According to the motion assist device of the second aspect of the present invention, the time constant representing a variation pattern of the plurality of state variables which represent the behavior state of the creature is adjusted by adjusting device. Therefore, the variation pattern (angular velocity) of the second oscillator and the variation pattern of the output from the actuator can be adjusted; as a result, the periodical motion of the creature can be assisted according to the output so as to approximate the motion rhythm of the creature to the desired motion rhythm.

A third aspect of the motion assist device of the present invention is dependent on the first aspect of the present invention, wherein the simultaneous differential equation for defining the second model contains a coefficient related to a desired value of a motion variable representing a motion scale of the creature, and a value of the coefficient is adjusted by the adjusting device.

According to the motion assist device of the third aspect of the present invention, a value of the coefficient related to a desired value of a motion variable representing a motion scale of the creature is adjusted by the adjusting device. Accordingly, the amplitude of the second oscillator and the amplitude of the output from the actuator can be adjusted; as a result, the periodical motion of the creature can be assisted so as to approximate the motion scale to the desired motion scale of the creature.

A fourth aspect of the motion assist device of the present invention is dependent on the first aspect of the present invention, wherein the orthosis includes a first orthosis mounted on a first body part, a second orthosis mounted on a second body part and a third orthosis mounted on a third body part of the creature; the actuator is directly connected to the first orthosis and the second orthosis and is indirectly connected to the third orthosis through the second orthosis as an intermediary.

According to the motion assist device of the fourth aspect of the present invention, the second orthosis is actuated to move with respect to the first orthosis, and the third orthosis is actuated to follow the second orthosis by the actuator. Thereby, in addition to the periodical motion of the second body part with respect to the first body part, the motion of the third body part can be assisted so as to follow the motion of the second body part.

DETAILED DESCRIPTION OF THE PREFERRED EMBODIMENTS

An embodiment of a motion assist device according to the present invention will be described with reference to the drawings. Hereinafter, symbols "L" and "R" are used to differentiate a left side and a right side of legs or the like. However, the symbols may be omitted if there is not necessary to differentiate the left side and the right side or a vector having both of the left and right components is mentioned. Moreover, symbols "+" and "−" are used to differentiate a flexion motion (forward motion) and an extension motion (backward motion) of the leg (in particular, a thigh).

Figure 1:
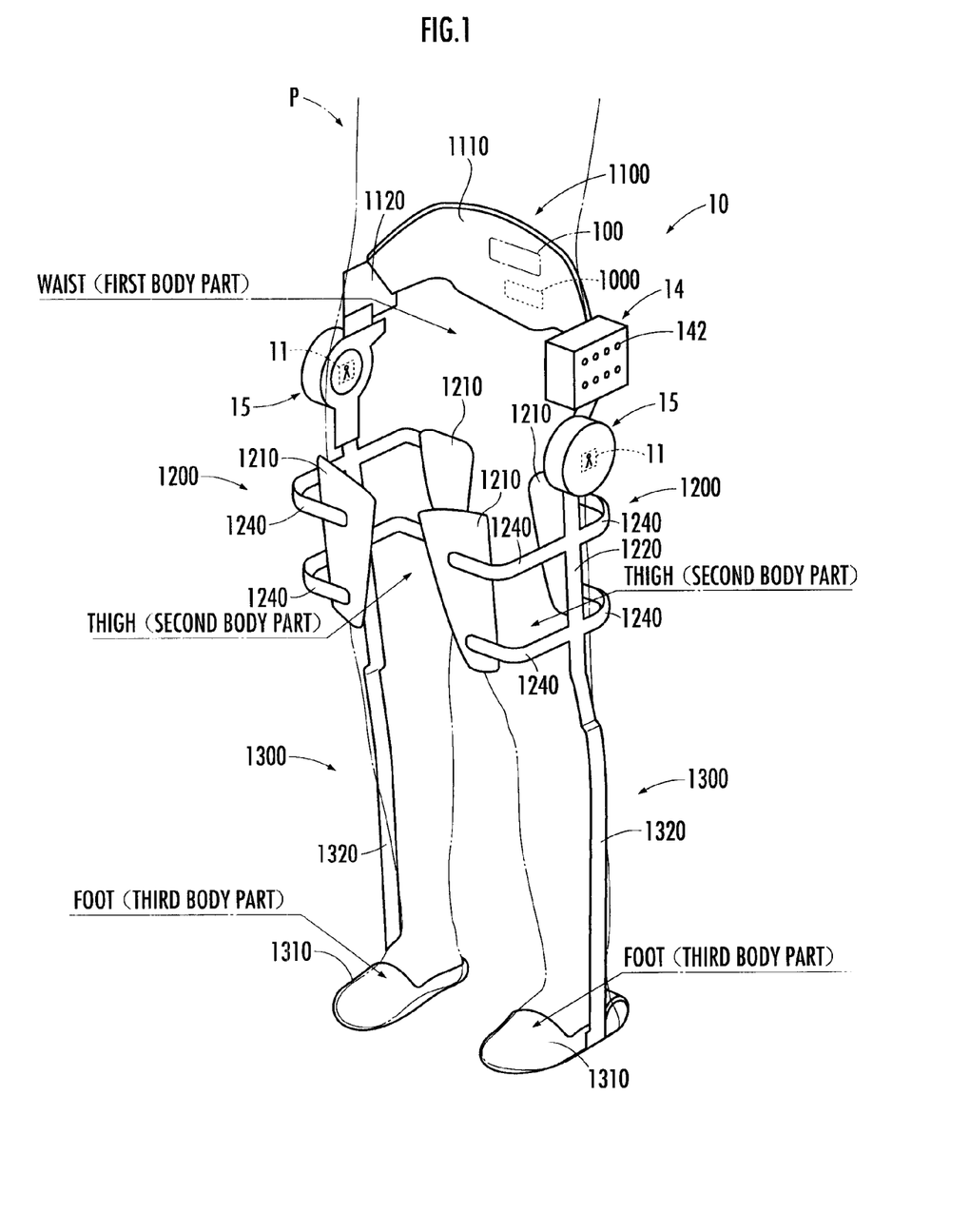
FIG. 1 is an explanatory diagram schematically illustrating a motion assist device according to an embodiment of the present invention.

The motion assist device 10 as illustrated in FIG. 1 is a device which assists a human P in walking motion. The motion assist device 10 includes a first orthosis 1100 attached to a waist (a first body part) of the human P, a second orthosis 1200 attached to a thigh (a second body part) of the human P, a third orthosis 1300 attached to a foot (a third part) of the human P, a hip joint angle sensor 11, an actuator 15, a first controlling device 100, and a battery 1000.

The first orthosis 1100 includes a first supporter 1110 and a first link member 1120. The first supporter 1110 is made from a combination of a rigid material such as a rigid resin and a flexible material such as a fiber and is mounted on the waist backward. The first link member 1120 is made of a rigid resin, and is fixed at the first supporter 1110 in such a way that when the first supporter 1110 is attached to the waist, the first link member 1120 is located at both sides of the waist laterally. The second orthosis 1200 includes a second supporter 1210, a second link member 1220 and a rib member 1240. Similar to the first supporter 1110, the second supporter 1210 is also made from a combination of a rigid material and a flexible material and is mounted on a front side and a back side of the thigh, respectively. The second link member 1220 is made of a rigid resin, extending vertically along outside of the thigh and is connected to an output shaft of the actuator 15. The rib member 1240 is made of a rigid resin, extending laterally to the front side and back side of the thigh, respectively, while bending along with the thigh. The rib member 1240 is connected to the second supporter 1210. The third orthosis 1300 includes a third supporter 1310 and a third link member 1320. The third supporter 1310 is formed to have a shape of a slipper or a shoe which is mounted to a foot of the human P. The third link member 1320 is made of a rigid resin, extending vertically along the outside of the crus. An upper end portion of the third link member 1320 is movably connected to a lower end portion of the second link member 1220, and a lower end thereof is movably connected to or fixed at the third supporter 1310. Note that the third orthosis 1300 is optional.

The hip joint angle sensor 11 is comprised of a rotary encoder disposed on a transverse side of the waist of the human P and outputs a signal according to the hip joint angle. The actuator 15 is comprised of a motor, including either one or both of a reduction gear and a compliance mechanism where appropriate. The battery 1000 is housed in the first orthosis 1100 (for example, fixed in multiple sheets of cloth constituting the first supporter 1110), which supplies an electrical power to the actuator 15, the first controlling device 100 and the like. Note that it is acceptable to attach or house the first controlling device 100 and the battery 1000 in the second orthosis 1200 or the third orthosis 1300; it is also acceptable to dispose them separately from the motion assist device 10.

Figure 2:
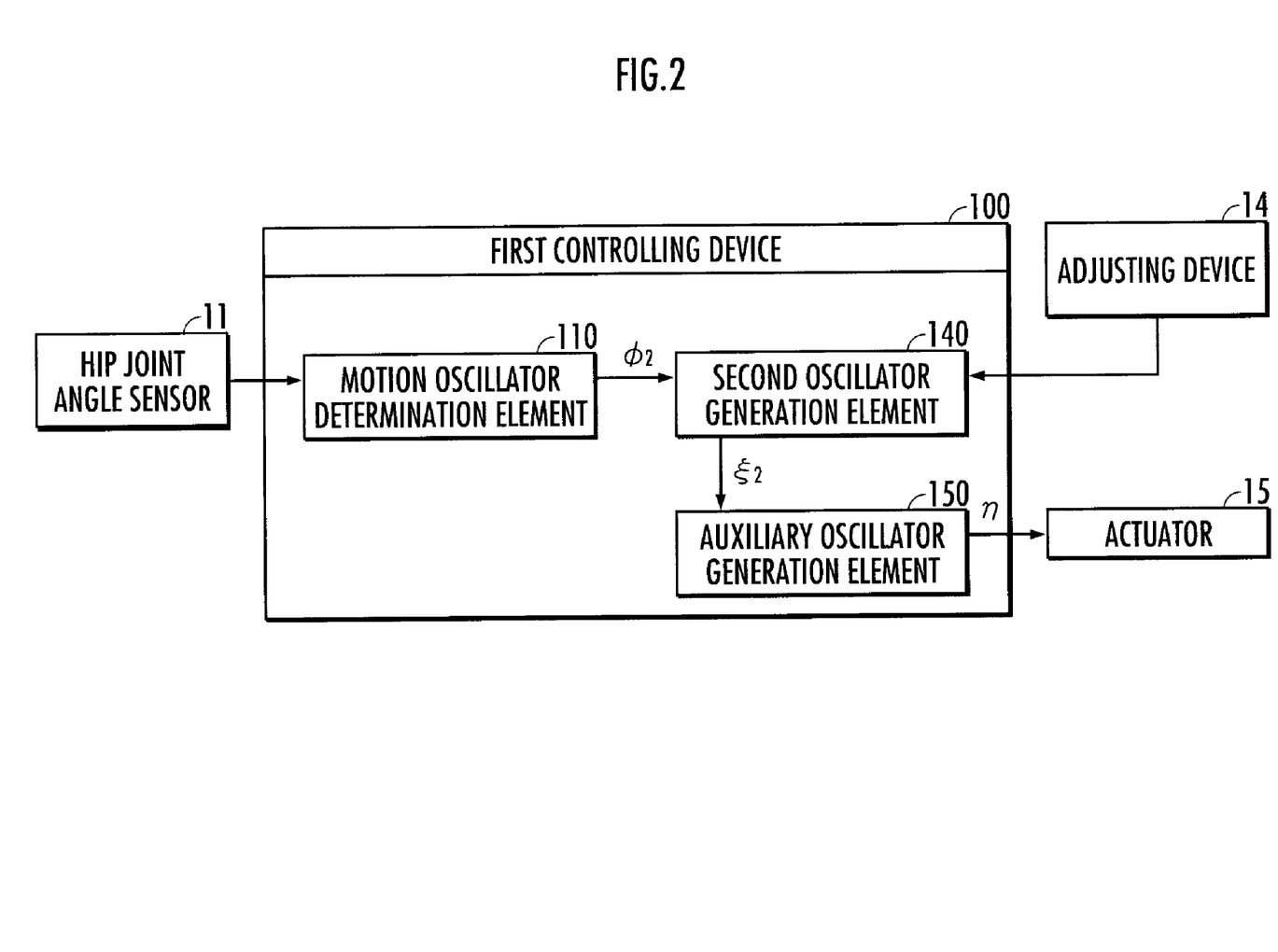
FIG. 2 is an explanatory diagram schematically illustrating a controlling device of the motion assist device.

The first controlling device 100 includes a computer housed in the first orthosis 1100 and a software stored in a memory or a storing device in the computer. The first controlling device 100 controls an operation or an output torque T of the actuator 15 by adjusting the electrical power supplied from the battery 1000 to the actuator 15. The first controlling device 100 illustrated in FIG. 2 is provided with a motion oscillator determination element 110, a second oscillator generation element 140, and an auxiliary oscillator generation element 150. Each element may be constituted from a mutually different CPU, or a universal CPU or the like.

The motion oscillator determination element 110 determines an angle of each hip joint as a second motion oscillator $\phi_2$ on the basis of an output from the hip joint angle sensor 11. The second motion oscillator $\phi_2$ varies periodically according to a periodical motion of the human P, and a variation pattern thereof is defined according to a magnitude and a phase (or an angular velocity which is a first order differentiation of the phase by time). Determination of an oscillator means to determine a periodical variation pattern of the oscillator.

The second oscillator generation element 140 generates a second oscillator $\xi_2$ as an output oscillation signal from a second model by inputting the second motion oscillator $\phi_2$ determined by the motion oscillator determination element 110 as an input oscillation signal to the second model. The "second model" is a model which generates an output oscillation signal varying at an angular velocity defined according to a second intrinsic angular velocity $\omega_2$ which is defined by the intrinsic angular velocity setting element 130 on the basis of an input oscillation signal.

The auxiliary oscillator generation element 150, on the basis of the second oscillator $\xi_2$ generated by the second oscillator generation element 140, generates an auxiliary oscillator $\eta$. The auxiliary oscillator $\eta$ is used to define a variation pattern of the torque applied to the thigh by the actuator 15 in the motion assist device 10.

Hereinafter, a method to assist the walking motion of the human P by the motion assist device 10 having the above-mentioned configuration will be described.

Figure 3:
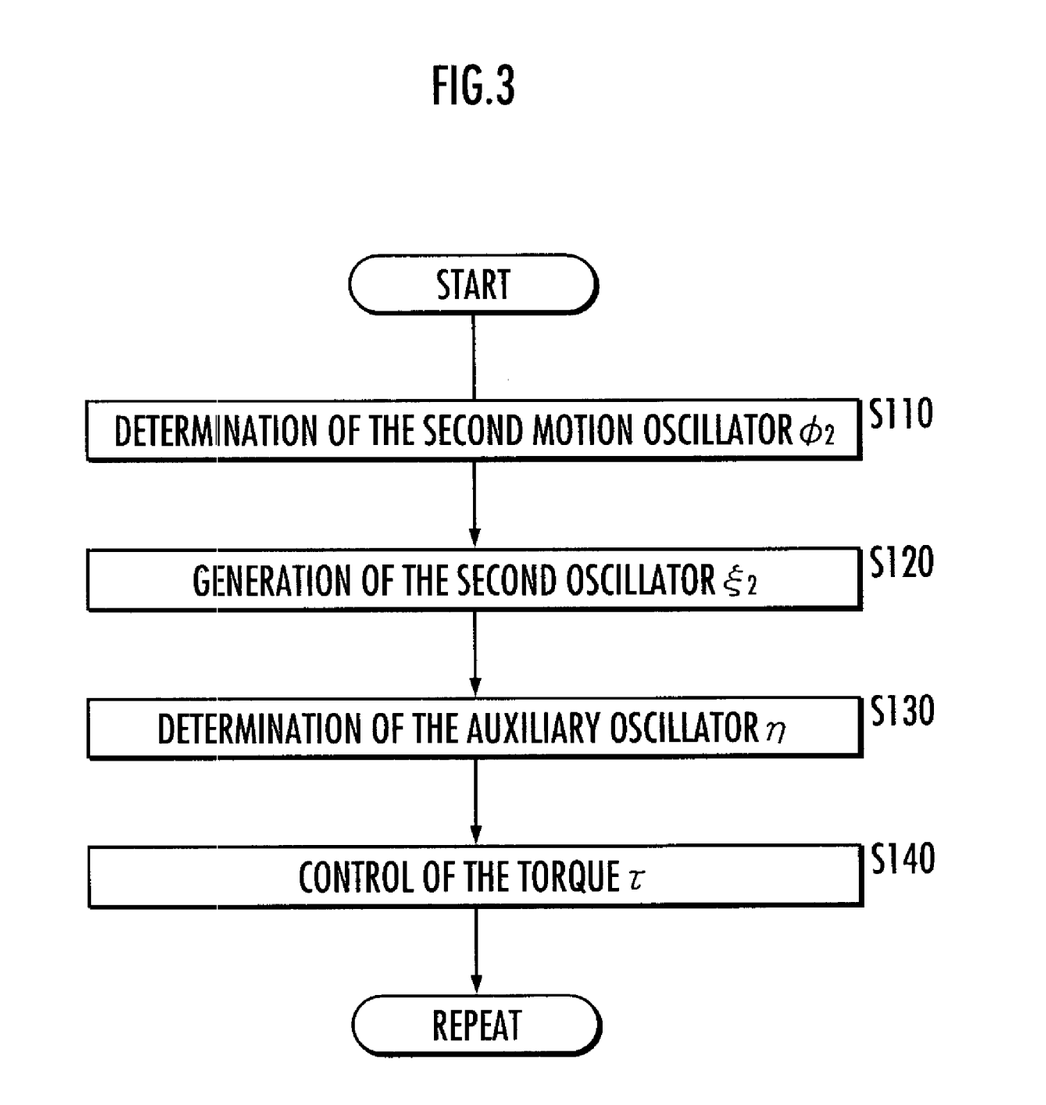
FIG. 3 is a flow chart illustrating a controlling method of the motion assist device.

The motion oscillator determination element 110 determines the left hip joint angle and the right joint angle of the human P as the second motion oscillator $\phi_2=(\phi_{2L}, \phi_{2R})$ on the basis of the output from the hip joint angle sensor 11 (FIG. 3/S110). Note that it is acceptable to determine an arbitrary variable varying periodically according to the periodical motion of the human P as the second motion oscillator $\phi_2$ by using an appropriate sensor. For example, a variation pattern of an angle or angular velocity of an arbitrary joint, such as the hip joint, knee joint, foot joint, shoulder joint, elbow joint and the like, a variation pattern of a position of the thigh, foot, upper arm, hand and waist (the position or the like in the anteroposterior direction or the vertical direction with reference to the center-of-gravity of the human P), or a variation pattern of a velocity or an acceleration may be determined as the second motion oscillator $\phi_2$. In addition, a variation pattern of various parameters varying at a motion rhythm in conjunction with that of the walking motion, such as sounds generated when the left and right feet step on ground, breathing sounds, deliberate phonations and the like, may also be determined as the second motion oscillator $\phi_2$.

Thereafter, the second oscillator generation element 140 generates the second oscillator $\xi_2=(\xi_{2L+}, \xi_{2L-}, \xi_{2R+}, \xi_{2R-})$ as the output oscillation signal of the second model, by inputting the second motion oscillator $\phi_2$ determined by the motion oscillator determination element 110 as the input oscillation signal to the second model (FIG. 3/S120). The second model is a model representing a correlation between a plurality of second elements, such as the neural elements and so forth responsible for the motions in the flexion direction (forward direction) and the extension direction (backward direction) of each leg. As aforementioned, the second model generates an output oscillation signal varying at an angular velocity defined according to the second intrinsic angular velocity $\omega_2$ set by the intrinsic angular velocity setting element on the basis of an input oscillation signal.

The second model is defined by a simultaneous differential equation represented by, for example, the equations (30). The simultaneous differential equation contains therein a state variable $\mu=\{\mu_i|i=L+, L-, R+, R-\}$ representing a behavior state (specified by amplitude and phase) to each of the flexion direction (forward direction) and the extension direction (backward direction) of each thigh, and a self-inhibition factor $\nu=\{\nu_i|i=L+, L-, R+, R-\}$ for representing compliance of each behavior state. Moreover, the simultaneous differential equation (30) contains therein a coefficient c in relation to a desired value $\zeta_0$ for each of the left hip joint angle and the right hip joint angle at the finished time of the flexion motion and the extension motion of the thigh in each walking cycle, respectively. A value of a time constant $t_{1i}$ and the coefficient $c_i$ in relation to the desired value $\zeta_{0i}$ of a motion variable $\zeta_i$ can be altered through operations on an adjusting button 142 of the adjusting device 14. In addition to or alternative to the time constant $t_{1i}$ or the coefficient $c_i$, a value of a time constant $t_2=\{t_{2i}|i=L+, L-, R+, R-\}$, a correlation coefficient $w_{i/j}$ and the like may also be altered through the adjusting device 14. Moreover, it is acceptable to increase the numbers of the second motion oscillator $\phi_2$ served as the determination subject. The more numbers of the second motion oscillator $\phi_2$ are input to the second model, the more correlation members in the simultaneous differential equation will become, leading to an appropriate assist in the periodical motion of the human P by considering the correlation between motion states of various body parts of the human P through the adjustment of the correlation coefficients.

$$\tau_{1L+}(du_{L+}/dt)=c_{L+}\zeta_{0L+}-u_{L+}+w_{L+/L-}\xi_{2L-}+w_{L+/R+}\xi_{2R+}-\lambda_L\nu_{L+}+f_1(\omega_{2L})+f_2(\omega_{2L})K_2\phi_{2L},$$

$$\tau_{1L-}(du_{L-}/dt)=c_{L-}\zeta_{0L-}-u_{L-}+w_{L-/L+}\xi_{2L+}+w_{L-/R-}\xi_{2R-}-\lambda_L\nu_{L-}+f_1(\omega_{2L})+f_2(\omega_{2L})K_2\phi_{2L},$$

$$\tau_{1R+}(du_{R+}/dt)=c_{R+}\zeta_{0R+}-u_{R+}+w_{R+/R-}\xi_{2L+}+w_{R+/R-}\xi_{2R+}-\lambda_R\nu_{R+}+f_1(\omega_{2R})+f_2(\omega_{2R})K_2\phi_{2R},$$

$$\tau_{1R-}(du_{R-}/dt)=c_{R-}\zeta_{0R-}-u_{R-}+w_{R-/L-}\xi_{2L-}+w_{R-/R+}\xi_{2R+}-\lambda_R\nu_{L+}+fhd1(\omega_{2R})+f_2(\omega_{2R})K_2\phi_{2R},$$

$$\tau_{2i}(d\nu_i/dt)=-\nu_i+\xi_{2i},$$

$$\xi_{2i}=H(u_i-u_{th})=0(u_i<u_{thi})\text{ or }u_i(u_i\geq u_{thi}),\text{ or}$$

$$\xi_{2i}=fs(u_i)=u_i/(1+\exp(-u_i/D)) \tag{30}$$

"$t_{1i}$" is the time constant for defining the variation feature of the state variable $u_i$, and is represented by the equation (31) using a $\omega$-dependant coefficient $t_{(\omega)}$ and a constant $\gamma=(\gamma_L, \gamma_R)$. The time constant $t_{1i}$ varies in dependence on the second intrinsic angular velocity $\omega_2$.

$$\tau_{1i}=(t(\omega_{2L})/\omega_{2L})-\gamma_L(i=L+,L-),(t(\omega_{2R})/\omega_{2R})-\gamma_R(i=R+,R-) \tag{31}$$

"$t_{2i}$" is the time constant for defining the variation feature of the self-inhibition factor $\nu_i$. "$w_{i/j}$" is a negative second correlation coefficient used to represent a correlation between the state variables $u_i$ and $u_j$ which represent the motions of the left and right legs of the human P toward the flexion direction and the extension direction as the correlation between each component of the second oscillator $\xi_2$ (correlation between the output oscillation signals of the plurality of the second elements). "$\lambda_L$" and "$\lambda_R$" are compliant coefficients. "$\kappa_2$" is a feedback coefficient related to the second motion oscillator $\phi_2$.

"$f_1$" is a first order function of the second intrinsic angular velocity $\omega_2$ defined according to the equation (32) having a positive coefficient c. "$f_2$" is a second order function of the second intrinsic angular velocity $\omega_2$ defined according to the equation (33) having coefficients $c_0$, $c_1$ and $c_2$.

$$f_1(\omega)\equiv c\omega \tag{32}$$

$$f_2(\omega)\equiv c_0+c_1\omega+c_2\omega^2 \tag{33}$$

The second oscillator $\xi_{2i}$ is set to be equal to zero when the state variable $u_i$ is smaller than a threshold value $u_{th}$; and equal to the value of $u_i$ when the state variable $u_i$ is equal to or greater than the threshold value $u_{th}$. In other words, the second oscillator $\xi_{2i}$ is defined by a sigmoid function fs (refer to equation (30)). Therefore, if the state variable $u_{L+}$ representing the behavior of the left thigh toward the forward direction increases, the amplitude of the left flexion component $\xi_{2L+}$ of the second oscillator $\xi_2$ becomes greater than that of the left extension component $\xi_{2L-}$; if the state variable $U_{R+}$ representing the behavior of the right thigh toward the forward direction increases, the amplitude of the right flexion component $\xi_{2R+}$ of the second oscillator $\xi_2$ becomes greater than that of the right extension component $\xi_{2R-}$. Further, if the state variable $u_{L-}$ representing the behavior of the left thigh toward the backward direction increases, the amplitude of the left extension component $\xi_{2L-}$ of the second oscillator $\xi_2$ becomes greater than that of the left flexion component $\xi_{2L+}$; if the state variable $u_{R-}$ representing the behavior of the right thigh toward the backward direction increases, the amplitude of the right extension component $\xi_{2R-}$ of the second oscillator $\xi_2$ becomes greater than that of the right flexion component $\xi_{2R+}$. The motion toward the forward or backward direction of the leg (thigh) is recognized by, for example, the polarity of the hip joint angular velocity.

Subsequently, the auxiliary oscillator generation element 150 sets the auxiliary oscillator $\eta=(\eta_L, \eta_R)$ on the basis of the second oscillator $\xi_2$ generated by the second oscillator generation element 140 (FIG. 3/S130). Specifically, the auxiliary oscillator $\eta$ is generated according to the equation (40). In other words, the left component $\eta_L$ of the auxiliary oscillator $\eta$ is calculated by adding a product of the left flexion component $\xi_{2L+}$ of the second oscillator $\xi_2$ and the coefficient $\chi_{L+}$ to a product of the left extension component $\xi_{2L-}$ of the second oscillator $\xi_2$ and the coefficient "$-\chi_{L-}$". The right component $\eta_R$ of the auxiliary oscillator $\eta$ is calculated by adding a product of the right flexion component $\xi_{2R+}$ of the second oscillator $\xi_2$ and the coefficient $\chi_{R+}$ to a product of the right extension component $\xi_{2L-}$ of the second oscillator $\xi_2$ and the coefficient "$-\chi_{R-}$".

$$\eta_L = \chi_{L+}\xi_{2L+} - \chi_{L-}\xi_{2L-}, \eta_R = \chi_{R+}\xi_{2R+} - \chi_{R-}\xi_{2R-} \quad (40)$$

Thereafter, an electrical current $I=(I_L, I_R)$ supplied to each of the left and right actuators 15 from the battery 1000 is adjusted by the first controller 100 on the basis of the auxiliary oscillator $\eta$. The electrical current I is represented in a form of, for example, $I(t)=G_1 \cdot \eta(t)$ by the auxiliary oscillator $\eta$ (wherein, $G_1$ is a ratio coefficient). Thereby, a force for moving each thigh (the second body part) with respect to the waist (the first body part) or the torque $T=(T_L, T_R)$ around the hip joint, which is applied to the human P from the motion assist device 10 through the first orthosis 1100 and the second orthosis 1200, is adjusted (FIG. 3/S140). The torque T is represented in a form of, for example, $T(t)=G_2 \cdot I(t)$ by the electrical current I (wherein, $G_2$ is a ratio coefficient). Thereafter, the series of the aforementioned processes are performed repeatedly. Note that it is acceptable to control the operation of the motion assist device 10 in a way irrelative to the aforementioned controlling method to move the thigh appropriately with respect to the waist in a duration where the human P walks 2 to 3 steps after the walking motion is initiated.

Figure 4:
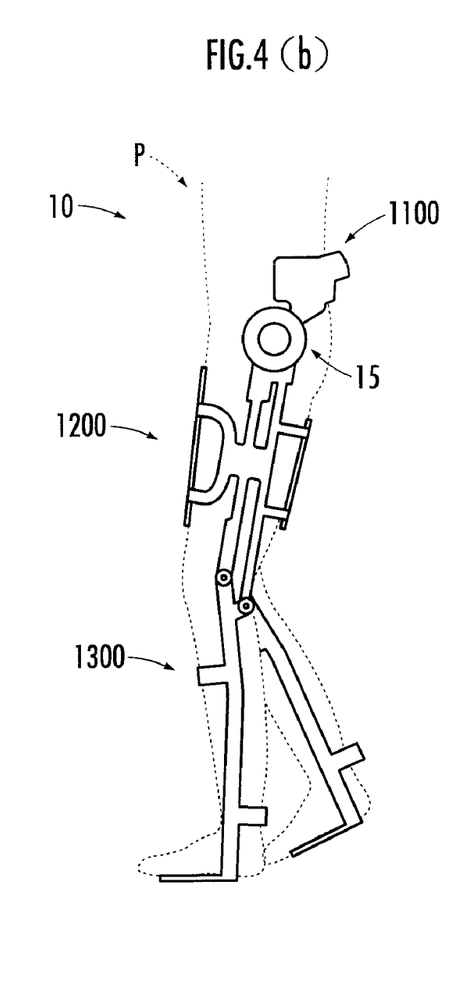
FIG. 4 is an explanatory diagram illustrating an operation of the motion assist device.

According to the motion assist device 10 which exhibits the aforementioned functions, the second orthosis 1200 is actuated to move with respect to the first orthosis 1100 by the actuator 15, as illustrated in FIGS. 4(a) and 4(b), and the third orthosis 1300 is actuated to follow the motion of the second orthosis 1200. Consequently, in addition to the periodical motion of the thigh (the second body part) with respect to the waist (the first body part), the crus (the third body part) is assisted so as to follow the motion of the thigh.

Since no other model but the second model is used (i.e., the second model is a "single model"), therefore the computation processing load needed to generate the second oscillator by the first controlling device 100 can be reduced accordingly. Further, the time constant $T1=\{T1i|i=L+, L-, R+, R-\}$ and the coefficient $c=\{c_i|i=L+, L-, R+, R-\}$ contained in the simultaneous equation (refer to the equation (30)) for defining the second model are partially adjusted via the operations on the button 142 of the adjusting device 14. Thereafter, the second oscillator $\xi_2$ is generated according to the adjusted second model and the output torque T applied to the human P is controlled to vary periodically according to the second oscillator $\xi_2$ (refer to S120 and S140 in FIG. 3). Accordingly, the periodical motion of the human P can be assisted by applying a force to the human P so as to make the motion scale and the motion rhythm of the periodical motion match the desired motion scale and the desired motion rhythm thereof, respectively, while reducing the computation processing load. Furthermore, the variation pattern of the second oscillator $\xi_2$ (angular velocity) and the variation pattern of the output torque T from the actuator 15 are adjusted by adjusting the time constant $T_{1i}$, representing the variation pattern of the state variable $u_i$. Thereby, the periodical motion of the human P assisted by the torque T is made to approximate the motion rhythm to the desired motion rhythm thereof. Additionally, the magnitude of the second oscillator $\xi_2$ and the magnitude of the output torque T from the actuator 15 can be adjusted by adjusting the coefficient $c_i$ relative to the desired value $\zeta_0$ of the motion variable $\zeta$. Thereby, the periodical motion of the human P can be assisted so as to approximate the motion scale of the periodical motion to the desired motion scale thereof.

In the aforementioned embodiment, it is described that the motion of the human P is assisted. However, it is also possible to assist the walking motion of an animal other than a human, such as a monkey (and/or ape), a dog, a horse, cattle and so forth.

In the aforementioned embodiment, the motion assist device 10 is constituted to assist the walking motion of the human P (refer to FIG. 1). As an another embodiment, it is acceptable to constitute the motion assist device 10 by varying the material, shape or the like of the first orthosis 1100, the second orthosis 1200 and the third orthosis 1300 so as to be attached to various body parts of the human P to assist various periodical motions except the walking motion. For example, it is acceptable to assist a periodical motion of the forearm with respect to the brachium. Moreover, it is acceptable to assist a periodical motion of the brachium with respect to the thigh of the human P.

In the aforementioned embodiment, the timing of the electrical stimulation applied to the human P from an electrical stimulation device 20 is controlled by a second controlling device 200 on the basis of the output signal representing the computation processing result of the second oscillator generation element 140 of the first controller 100. It is also acceptable to control the timing of the electrical stimulation applied to the human P from the electrical stimulation device 20 via the second controlling device 200 on the basis of the output signal representing the computation processing result of the first oscillator generation element 120 of the first controlling device 100 or the intrinsic angular velocity setting element 130. Moreover, it is acceptable to control the timing of the electrical stimulation applied to the human P from the electrical stimulation device 20 via the second controlling 200 on the basis of an output signal of the hip joint angle sensor 11, or a variation pattern of an output signal representing an acceleration in the vertical direction of the human P from an acceleration sensor attached thereto. Since a transition pattern between the stepping-on-ground state and the leaving-ground state of each foot of the human P can be estimated on the basis of the variation pattern of the output signal from the sensor, it is possible to apply an electrical stimulation to the human P at an appropriate timing and magnitude from the viewpoint of maintaining an appropriate posture by considering the periodical motion state of the human P whose body function is degraded.

Figure 5:
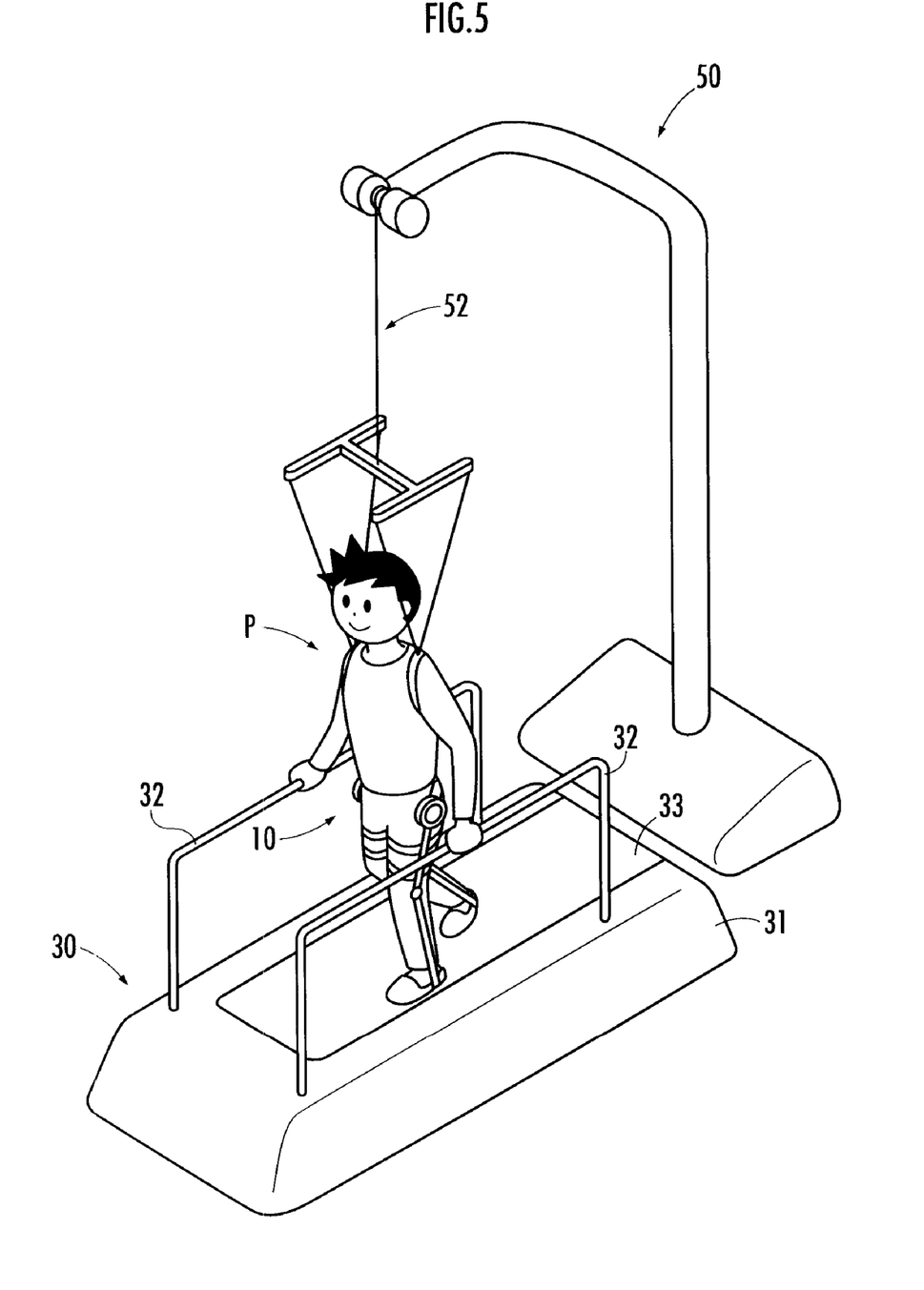
FIG. 5 is an explanatory diagram illustrating a method of walk training by using the motion assist device (part 1)

The present invention is not limited to the motion assist device 10 only, it is also possible to include a treadmill 30 and a lifter (a load alleviation tool) 50 when it is used in the walking training of the human P as illustrated in FIG. 5. The human P walks by advancing forward against the motion of an endless belt 33 which is moving backward with a partial weight thereof supported by holding a handrail (load alleviation tool) 32 disposed at both sides of a base 31 of the treadmill 30 with both hands, respectively. The endless belt 33 is supported over a plurality of rollers and the speed of the endless belt 33 is controlled by controlling the rotating velocity of a part of the plurality of rollers. Additionally, a partial weight of the human P is supported by the lifter 50 through a wire 52 whose roll length is adjustable.

Figure 6:
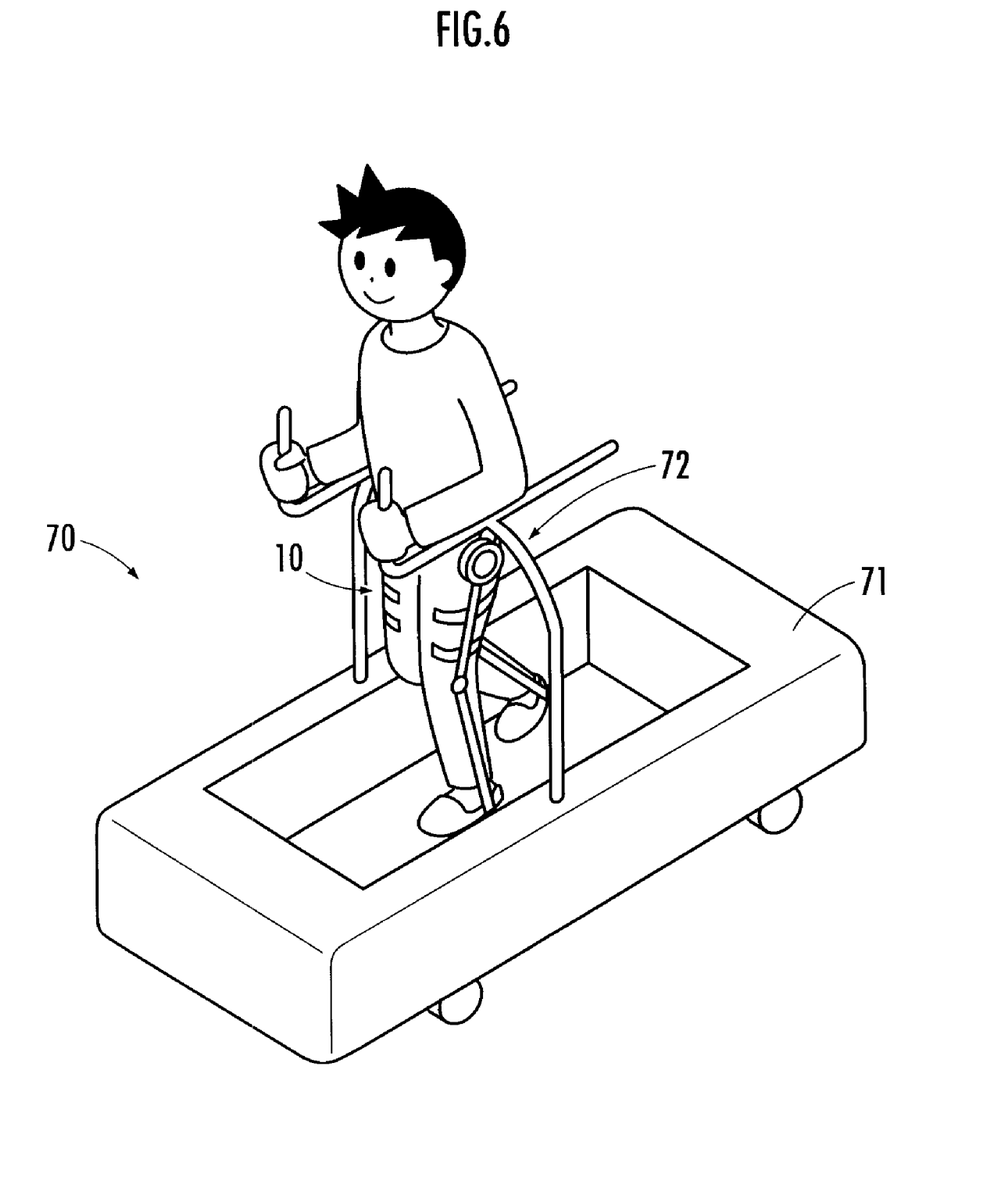
FIG. 6 is an explanatory diagram illustrating a method of walk training by using the motion assist device (part 2).

Furthermore, a walking machine 70 as illustrated in FIG. 6 may be used in the walking training of the human P. A partial weight of the human P is supported by holding a handrail (load alleviation tool) 72 which is disposed at both sides of a base 71 of the walking machine 70 with both hands, respectively. The base 71 can move with the rotating speed of wheels disposed at the bottom thereof controlled according to the walking motion of the human P.

What is claimed is:

1. A motion assist device which comprises an orthosis adapted to be mounted on a creature, an actuator connected to the orthosis, and a controlling device configured to control an amplitude and a period or phase of an output of the actuator, and assists a periodical motion of the creature by applying the output to the creature through the orthosis, the controlling device including:

a motion oscillator determination element configured to determine a motion oscillator as a variable which periodically varies according to the motion of the creature;

a single oscillator generation model stored on the controlling device, the single oscillator generation model defined by a simultaneous differential equation of a plurality of state variables representing a behavior state of the creature for generating an output oscillation signal varying at an angular velocity defined according to an intrinsic angular velocity on the basis of an input oscillation signal;

an oscillator generation element configured to generate an oscillator as the output oscillation signal from the single oscillator generation model stored on the controlling device by inputting the motion oscillator determined by the motion oscillator determination element as the input oscillation signal to the single oscillator generation model so as to generate the oscillator; and an adjusting device configured to adjust a value of a member or a coefficient contained in the simultaneous differential equation of the single oscillator generation model, wherein the controlling device is configured to control the amplitude and the period or phase of the output of the actuator using the oscillator as a control basis, the single oscillator generation model is an only oscillator generation model stored on the controlling device, and the single oscillator generation model is an only oscillator generation model used to generate the oscillator.

2. The motion assist device according to claim 1, wherein the simultaneous differential equation for defining the single oscillator generation model contains a time constant representing a variation pattern of the plurality of state variables, and a value of the time constant is adjusted by the adjusting device.

3. The motion assist device according to claim 2, wherein the simultaneous differential equation for defining the single oscillator generation model contains a coefficient related to a desired value of a motion variable representing a motion scale of the creature, and a value of the coefficient is adjusted by the adjusting device.

4. The motion assist device according to claim 3, wherein the adjusting device includes an adjusting button which is configured for manual operation by the creature, and the value of the time constant and the coefficient related to the desired value of the motion variable representing the motion scale of the creature contained in the simultaneous differential equation of the single oscillator generation model are adjusted through manual operation of the adjusting button by the creature.

5. The motion assist device according to claim 2, wherein the adjusting device includes an adjusting button which is configured for manual operation by the creature, and the value of the time constant contained in the simultaneous differential equation of the single oscillator generation model is adjusted through manual operation of the adjusting button by the creature.

6. The motion assist device according to claim 1, wherein the simultaneous differential equation for defining the single oscillator generation model contains a coefficient related to a desired value of a motion variable representing a motion scale of the creature, and a value of the coefficient is adjusted by the adjusting device.

7. The motion assist device according to claim 6, wherein the adjusting device includes an adjusting button which is configured for manual operation by the creature, and the value of the coefficient related to the desired value of the motion variable representing the motion scale of the creature contained in the simultaneous differential equation of the single oscillator generation model is adjusted through manual operation of the adjusting button by the creature.

8. The motion assist device according to claim 1, wherein the orthosis includes a first orthosis configured to be mounted on a first body part, a second orthosis configured to be mounted on a second body part and a third orthosis configured to be mounted on a third body part of the creature; the actuator is directly connected to the first orthosis and the second orthosis and is indirectly connected to the third orthosis through the second orthosis as an intermediary.

9. The motion assist device according to claim 8, wherein the third orthosis includes a supporter configured to be mounted to a bottom of a foot of the creature.

10. The motion assist device according to claim 1, wherein the variable which periodically varies according to the motion of the creature is an angle of each hip joint, and the motion oscillator determination element is configured to determine the motion oscillator as the angle of each hip joint.

11. The motion assist device according to claim 10, further comprising a hip joint angle sensor configured to measure a hip joint angle for each hip of the creature, and to communicate the measured hip joint angle for each hip to the motion oscillator determination element.

12. The motion assist device according to claim 1, wherein the adjusting device includes an adjusting button which is configured for manual operation by the creature, and the value of the member or the coefficient contained in the simultaneous differential equation of the single oscillator generation model is adjusted through manual operation of the adjusting button by the creature.

13. The motion assist device according to claim 12, wherein the variable which periodically varies according to the motion of the creature is an angle of each hip joint, and the motion oscillator determination element is configured to determine the motion oscillator as the angle of each hip joint.

* * * * *